US011929636B2

(12) United States Patent
Moorman (10) Patent No.: US 11,929,636 B2
(45) Date of Patent: *Mar. 12, 2024

(54) HYBRID GENERATOR SYSTEM AND METHOD OF OPERATION AND CONTROL

(71) Applicant: Moser Energy Systems, Evansville, WY (US)

(72) Inventor: Darrin Moorman, Oldenburg, IN (US)

(73) Assignee: MOSER ENERGY SYSTEMS, Evansville, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,042

(22) Filed: Jun. 13, 2022

(65) Prior Publication Data

US 2022/0311266 A1 Sep. 29, 2022

Related U.S. Application Data

(63) Continuation of application No. 16/779,949, filed on Feb. 3, 2020, now Pat. No. 11,394,231.

(60) Provisional application No. 62/800,144, filed on Feb. 1, 2019.

(51) Int. Cl.
*H02J 7/34* (2006.01)
*H02J 7/00* (2006.01)
*H02J 3/32* (2006.01)
*H02J 3/46* (2006.01)

(52) U.S. Cl.
CPC .............. *H02J 7/34* (2013.01); *H02J 7/0068* (2013.01); *H02J 3/32* (2013.01); *H02J 3/46* (2013.01); *H02J 2300/10* (2020.01)

(58) Field of Classification Search
CPC .. H02J 3/32; H02J 3/46–50; H02J 7/32; H02J 7/34; H02J 7/35; H02J 7/0068; H02J 7/1415; H02J 2300/10
See application file for complete search history.

(56) References Cited

U.S. PATENT DOCUMENTS

| | | | |
|---|---|---|---|
| 2011/0148209 A1* | 6/2011 | Williams | H02J 7/34 307/75 |
| 2014/0094979 A1* | 4/2014 | Mansfield | H02J 3/381 700/291 |
| 2014/0159365 A1* | 6/2014 | Algrain | H02J 3/32 290/7 |
| 2014/0306526 A1* | 10/2014 | Fontana | H02J 3/00 363/78 |
| 2015/0338868 A1* | 11/2015 | Takaguchi | H02J 3/32 307/126 |
| 2016/0359328 A1* | 12/2016 | Hunt | H02J 9/062 |
| 2019/0131667 A1* | 5/2019 | Huang | H02J 7/0018 |
| 2019/0148945 A1* | 5/2019 | Nakayama | H02J 3/38 700/291 |

(Continued)

*Primary Examiner* — Daniel Cavallari
*Assistant Examiner* — David A Shiao
(74) *Attorney, Agent, or Firm* — HAYNES AND BOONE, LLP (57) ABSTRACT

Devices, methods and systems for providing electrical power are provided. In some embodiments, hybrid generator systems are provided that are capable of both receiving and delivery powering to various different devices and applications, and that are operable to service various demands. Efficiencies in production and signal conditioning are provided wherein stored energy devices and related controls are capable of responding to variable power demands.

17 Claims, 6 Drawing Sheets

(56) References Cited

U.S. PATENT DOCUMENTS

2019/0173283 A1* 6/2019 Epel .................... G05B 13/048
2019/0267809 A1* 8/2019 Cho .......................... H02J 3/28
2021/0050725 A1* 2/2021 Jensen .................... H02J 3/388

* cited by examiner

HYBRID GENERATOR SYSTEM AND METHOD OF OPERATION AND CONTROL

CROSS-REFERENCE TO RELATED APPLICATIONS

This application is a continuation of U.S. Non-Provisional patent application Ser. No. 16/779,949, filed Feb. 3, 2020, which claims the benefit of U.S. Provisional Application No. 62/800,144, filed Feb. 1, 2019, the entire disclosures of which are incorporated by reference herein.

FIELD

The present disclosure relates generally to methods and systems for power generation, generators, and management and control thereof. More specifically, embodiments of the present disclosure comprise hybrid generator systems and micro-grid applications.

BACKGROUND

Various methods and systems for "hybrid" power systems are known. As used herein, "hybrid" generally refers to systems that combine conventional gas-powered or engine-drive power generation devices with power electronics and battery storage. Hybrid systems are known to be used in power applications including automobiles and transportation systems where the range and efficiency of a gas-powered engine is enhanced. Such systems include those shown and described in U.S. Patent Application Serial No. 2011/0120789 to Teraya, which is hereby incorporated by reference in its entirety.

Hybrid systems are also known in power generation applications as a means to improve efficiency. Typically, these hybrid power systems are designed to operate as a conventional generator during normal, relatively high-power demand cycles and operate solely on stored energy (e.g. battery power) during periods of reduced power demand. This provides a means to improve efficiency, reduce fuel consumption, and/or operate in "stealth mode" with a much lower heat and noise signature.

Hybrid technologies can further be used to provide supplemental power to generators during peak loading. This momentary "battery assist" to the engine-driven generator can significantly improve peak load capability or reduce a required size of the generator for applications with relatively high peak loads and much lower normal operating loads. Known hybrid systems provide power support during various modes of operation such as a hybrid vehicle that maintains vehicle accessories and "creeps" in traffic on stored energy and then provides supplemental power when overtaking traffic or accelerating onto a freeway.

Hybrid generators used in power generation applications differ from vehicle applications in various ways. For example, hybrid generators for power generation typically operate at a substantially fixed speed (e.g. 1,800 RPM or 1,500 RPM depending on desired output frequency). As load is applied to the generator, power electronics can provide power from a stored energy source (e.g. a battery) to assist the engine.

SUMMARY

Accordingly, embodiments of the present disclosure contemplate and provide methods and systems for hybrid generators including conventional or gas-fired engines and a supplemental energy source such as an energy storage module ("ESM").

In various embodiments, hybrid power systems are provided that support a range of power levels of a base engine-drive generator. In certain embodiments, this support is provided by a generator system that comprises a stored energy source (e.g. a battery). The stored energy source is contemplated as comprising the sole power source from which the generator system provides power under light load conditions. Additionally, the stored energy source provides supplemental power or support for an engine of the generator during peak load conditions. Such support is contemplated as preferably comprising short, high-load transient steps. Further, the stored energy source is operable to provide power quality or power conditioning at various different power loads, including periods of normal load(s).

In one embodiment, a hybrid generator system or device is provided that comprises a generator with a peak power generation capacity of 410 kW. The hybrid generator comprises an 11-liter gaseous fueled generator integrated with an ESM. The ESM comprises a 500 kVA bi-directional multi-port inverter and a 120 kWh lithium-ion battery with a continuous 2C charge/discharge rating and 3C peak rating. The hybrid generator system is contemplated as being integrated with other three-phase power sources, and/or renewable energy resources in both grid-parallel and grid-isolated modes. It will be recognized, however, that various system, devices, and methods of operation disclosed herein are not limited to a particular gaseous fueled power unit or to any particular ESM. Various inventive aspects of the present disclosure are provided and detailed herein that are not limited to an engine, ESM or other device of any particular specification or capabilities. It is contemplated that various alternatives to the foregoing devices are provided, particularly (but not limited to) applications and situations where it is desirable to scale the power and performance requirements of a generator unit up or down.

In various embodiments, an ESM is provided that comprises a separate, stand-alone system providing solid-state support to any conventional generator or other source of electrical power. In certain embodiments, the ESM is contemplated as comprising a 360 kW peak, 240 kW continuous power output at a continuous 480V.

In certain embodiments, hybrid generator systems of the present disclosure are provided with application-specific output requirements for voltage and frequency. For example, a Baker Hughes Electrospeed Advantage Variable Speed Drive commonly used in oil field submersible pump applications specifies a voltage tolerance on a 480V 3-phase system of +5% to −15% (504V-408V) and a frequency tolerance of +/−2 Hz (58 Hz-62-Hz). Embodiments of the present disclosure provide an ESM that is operable to be programmed to operate cinder all load conditions within the requirements of such a device, and such that the voltage and frequency output of the ESM is always within the tolerances of such a device.

In various embodiments, inverter "droop tuning" of a generator system is provided. Specifically, in certain embodiments, an inverter associated with and/or in communication with an ESM comprises the ability to anticipate or react to a droop, reduction or drop in a generator speed (i.e. RPMs) in a quicker and more efficient manner than a conventional gas-fired engine could react to such a droop. Conventional gas-fired generators may comprise the ability to detect a reduction in RPM when an increase in load is applied. After this reduction is detected, a signal may be generated to increase a throttle and restore generator speed. This reactionary approach provides a slow response, particularly when coupled with the delays associated with increasing a throttle to the time a desired engine speed is restored. In some embodiments, systems of the present disclosure are operable to detect an increase in load or demand and the inverter of an ESM is operable to provide power or current to the generator in anticipation of or response to a droop event. In some embodiments, the ESM reacts to a droop after the droop has been experienced, and wherein reaction time to restore engine speed is still reduced relative to conventional systems that rely solely on throttling a gas engine to accommodate changes in load.

In various embodiments, a dynamic load is used to establish the AC input characteristics to a system (for example, from a generator, renewable sources, and/or the grid) and inverter tuning is optimized to match the input characteristics. In some embodiments, generator systems of the present disclosure comprise artificial intelligence of "active learning" features wherein an ESM controller monitors AC: input response and auto-corrects to continuously optimize tuning as the AC input performance varies.

In various embodiments of the present disclosure, hybrid generators are provided that comprise a programmable energy output using direct or interactive tuning to integrate controlled generating resources. In some embodiments, hybrid generator systems are provided that comprise self-determining and integration of energy resources, including controlled resources (e.g. generators). In some embodiments, noel-controlled (e.g. renewable) energy resources and utility power is provided to generator systems. In various embodiments, one or more active-learning functions is provided that allow(s) for the system to adjust to inevitable variability in generating resources.

Devices and systems of the present disclosure integrate the performance tuning curves of an inverter drive (i.e. power from an ESM) and an engine-driven generator. In such embodiments, the inverter and the generator comprise respective tuning set points and curves that define how each system responds to deviations in voltage and/or frequency. In order to have a balanced system in hybrid mode that relies on an optimal power response from each system providing power it is necessary to modify the tuning parameters of each contributing system. This allows a hybrid system to deliver optimum performance from each system and thus the maximum and optimum energy performance as a combined and balanced hybrid power system. It is contemplated, for example, that systems of the present disclosure are incorporated into a renewable energy resource that supplies a majority of demand to a load, with a balance of needed power being provided by a utility grid, and wherein a generator is provided to service emergency or peak load situations. Under certain energy load and cost scenarios, the generator is operable to provide supplemental power to the load or application rather than relying on utility support. ESM controllers of the present disclosure are operable to command the generator to operate in this way so as to reduce dependence from the grid and/or automatically select or prioritize a power generating source based on price per kW-hr.

In various embodiments, hybrid generator systems are provided with direct tuning control technology that allow for active and direct tuning and adjustment of each controller responsible for each respective generating source (i.e. each control device may be directly programmed and/or reprogrammed).

In various embodiments, generator systems of the present disclosure comprise control systems that allow for interactive tuning, particularly where access to a controller of a generating source is not available or possible. In such embodiments, an ESM is provided that can be operated in a mode wherein the ESM is connected to the generating source and does not have access to the tuning parameters in the generator controller. The ESM is operable to command, sense and map a series of known load steps delivered to an onboard battery energy storage. An ESM controller is operable to adjust its own tuning to match a fixed tuning setting of a generating source. In such embodiments, an ESM is provided that is operable to integrate and "hybridize" virtually any generator.

In various embodiments, generator systems of the present disclosure are capable of integration with multiple energy resources including, but not limited to, engine-driven generators, renewable energy systems and pre-existing utility power supply from the grid. In such embodiments, an auto-determining function is provided. Auto-determining functions of the present disclosure comprise various features including, for example, a throttle control that responds to power demands. In such embodiments, a load step is commanded from an ESM controller and the response and "droop curve" of the system is typical of a controlled generating source. The ESM controller is operable to detect a load step before or after generator speed has been impacted, and supply additional power from the ESM (e.g. batteries) to accommodate the load. The ESM controller further comprises the ability to recognize a decrease in load or demand, and reduce a supplemental power supply.

Various renewable energy resource, such as photovoltaics, do not typically have the ability to adjust or throttle based on load demands. In other words, the power output of such devices is generally unresponsive to changes in load. In various embodiments of the present disclosure, an ESM controller is provided that is operable to determine that a non-controllable energy resource (e.g. a solar panel) is connected based on a lack of active response to power demands from the ESM.

Generator systems of the present disclosure are further capable of recognizing when a power source comprises a utility power source (i.e. the grid). Utility power comprises a near-infinite response to power commands with no appreciable "droop curve." ESM controllers of the present disclosure are capable of analyzing such information and recognizing the absence of a droop curve as the indication of an incoming utility power. The same logic and functionality are applied to large (e.g. multi-MW) generating devices and assets. Auto-determining functions and features of the present disclosure are capable of allowing systems of the present disclosure to operate as self-forming micro-grid systems that are capable of making decisions based on resiliency and energy costs to provide a more robust and cost-effective system and reduce the need for human intervention.

Embodiments of the present disclosure provide generator systems that comprise active-learning functions that adjust tuning parameters and correct the interaction of generating resources by monitoring and recording each significant loading or unloading event. By comparing these events, the interaction tuning of the inverter is adjusted in real time such that the system's reliability, performance, and efficiency are constantly maintained at the peak level of performance. In this way, as a generating resource advances through its life-cycle and normal degradation in performance occurs, the system will compensate and continue to function at peak performance and reliability. In the same way, a fast-occurring event, such as a "dead cylinder" from a failed spark plug will allow the system to correct for this situation. Parameters can be set to limit how much active compensation can occur.

In various embodiments, generator systems are provided that vastly improve power quality and power delivery while reducing the total greenhouse gas emissions. Embodiments of the present disclosure reduce emissions by enabling the use of a much smaller engine-driven generator that is matched to a continuous load instead of a peak load. Engine efficiency is improved by operating only at the ideal power nodes, thereby provided the added benefit of improving engine reliability and durability. Power delivery and power quality is significantly improved and supports loads sensitive to voltage and frequency deviation through the programmable, solid-state output of an ESM. Embodiments of the present disclosure further provide for integration and connectivity to renewable energy resources with a controlled, commanded distributed energy resource such as an engine-driven generator and the ability to operate in a grid-independent and a grid-connected mode. Various embodiments and systems provided herein transform a distributed energy resource into a sophisticated, deployable, self-forming microgrid with myriad uses and applications.

Generator systems and ESMs of the present disclosure are contemplated for use in various applications. In some embodiments, an ESM is provided to support a single generator that provides power to an application (e.g. a downhole pump for oil and gas applications, a hospital or other building that has lost a connection to a municipal grid, etc.). In further embodiments, it is contemplated that devices, methods and systems of the present disclosure are employed as grid support systems. In such grid support systems and embodiments, it is contemplated that one or more ESMs (with or without an interconnected generator) are connected to a power generation source. In some embodiments, at least one ESM is provided in combination with a photovoltaic array that is operable to provide electric power. As one of skill in the art will recognize, the output from a photovoltaic array typically comprises a variable output with respect to voltage, frequency and/or current, at least in part due to environmental conditions and the variable nature of the amount of solar energy that is received by the array over time. This variability can present problems for the grid, the grid service provider, and the end-users and devices that are provided with power from the photovoltaic array. Accordingly, in some embodiments, at least one ESM is provided in connection with a photovoltaic array and the ESM serves to provide frequency support, buffering, and signal conditioning for the photovoltaic array. The ESM preferably comprises a programmable frequency output such that an output frequency of the system (including power provided by the grid and/or photovoltaic array) is provided at a constant (e.g. a user-selected 60 Hz). As shown and described herein, the ESM comprises an inverter, an inverter controller and a battery management system ("BMS") that is capable of and operable to regulate the output frequency. The ESM removes variability at least in an output frequency of an electric power supply. As one of ordinary skill in the art will recognize, the foregoing example related to a photovoltaic power supply is provided as one example of variable loading that can be addressed and improved by embodiments of the present disclosure. Devices, system, and methods of the present disclosure are not limited to any particular application. For example, it is also contemplated that devices, systems and methods of the present disclosure are also employed in a wind farm application wherein power supply from wind patterns may result in similar variability from an electrical power generation source.

In various embodiments, systems of the present disclosure including ESMs can be modified and programmed to function with various different systems and devices. Specifically, an ESM of the present disclosure can be programmed and required to maintain specific operating parameters of interconnected devices. For example, an ESM can be programmed such that a frequency output of an associated generator is maintained within a specific range (e.g. 59.8 Hz and 60.2 Hz), and the controller is operable to control the ESM to dispense and convey power as needed to maintain this generator frequency output.

In various embodiments, systems of the present disclosure comprise at least one ESM and at least one generator provided in combination and in communication with one another. It is contemplated that generators of the present disclosure, including known pre-existing generators comprise a built-in controller that is operable to respond to changes in power demand and increase or decrease a throttle and engine speed to increase and decrease power output, for example. In some embodiments of the present disclosure, an ESM is provided in combination with such a device wherein the ESM comprises an inverter, controller and related logic that is capable of responding quickly to changes in load and demand. In preferred embodiments, the controller and logic of the generator is not deactivated, but is supplemented by the ESM features and wherein the ESM response to a droop cure (i.e. drop in generator frequency) is faster than a similar response that would otherwise be provided by the generator.

In various embodiments of the present disclosure, auto-determining features are provided within ESMs that are operable to determine a type of power supply that the ESM is connected to. For example, controllers and logic are provided with ESMs of the present disclosure that are operable to detect, monitor, and analyze a power supply's response to a demand from the ESM. For example, when an ESM is connected to a power source and signals a demand to the power source for an increase in power, the ESM is operable to recognize if and when the response from the power supply is a steady output. Such a response from the power supply indicates that the power supply is a renewable source (e.g. a photovoltaic field or wind farm) that is simply not capable of quickly increasing a power supply. Further, if the response from the power supply comprises an infinite response such that power demanded is supplied on a relatively short timescale, the ESM is operable to recognize this response and determine that the power supply is the utility grid. Based on the results and determinations of the auto-determining features, systems of the present disclosure are further operable to adjust an output or "droop" curve.

In one embodiment, a hybrid generator system is provided. The system comprises an energy storage module comprising at least one battery for receiving, storing and distributing electrical power; a generator in communication with the energy storage module; and an inverter in communication with the energy storage module. The inverter comprises a bi-directional inverter that is operable to transmit and receive electrical power to and from the energy storage module and the generator in the form of a current. A controller is provided that is operable to receive and transmit information from at least one of the energy storage module, the inverter, the battery, and a grid.

In various embodiments, methods of operating systems of the present disclosure and providing electrical power are provided. In one embodiment, a method of providing electrical power is provided wherein the method comprises providing a hybrid generator system comprising: an energy storage module comprising at least one battery; an inverter in communication with the energy storage module; a controller that is operable to receive and transmit information from at least one of the energy storage module, the inverter, the battery, the generator, and a grid. At least one of an output voltage, current and frequency of the generator is continuously monitored by the controller, and an amount of power being distributed by the energy storage module is increased or decreased based on at least one of an output voltage, current and frequency of the generator dropping below or exceeding a predetermined value or based on an Observed rate of change of at least one of an output voltage, current and frequency of the generator. For example, if a rate of change of a generator voltage value is identified as indicating a sudden increase in load, the ESM may be activated. At least one of an output voltage, current and frequency of the generator are monitored for a return to a predefined normal operating status, and the amount of power being distributed by the energy storage module is reduced or terminated based on such a condition being satisfied.

In some embodiments, systems are provided that are configured to monitor and record loading and unloading events. The controllers and logic provided to the generator system or devices of the present disclosure are operable to monitor, record, detect, predict, and determine when a loading or unloading event will affect the generator system. The generator system can use this recorded historical data, alone or in combination with other recorded data, to anticipate and preemptively-respond to a predicted loading or unloading event. For example, a generator system of the present disclosure is operable to anticipate that a sharp, prolonged load will be placed on the generator system at a certain time of day; in order to meet the power requirements of this load the generator system can slowly and efficiently increase its power output to the predetermined time, such that when the predicted load is placed on the generator system the power profile of the generator system does not change significantly. Furthermore, generator systems of the present disclosure can also anticipate an unloading or ramping down event and adjust accordingly. In order to meet the energy demands during an unloading or ramping down period, systems of the present disclosure can efficiently reduce power output of the generator while increasing power output of the ESM to accommodate demands during a contemplated ramp-down of the generator. The Summary is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements or components. Additional aspects of the present invention will become more readily apparent from the Detailed Description, particularly when taken together with the drawings.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings giver below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Figure 1:
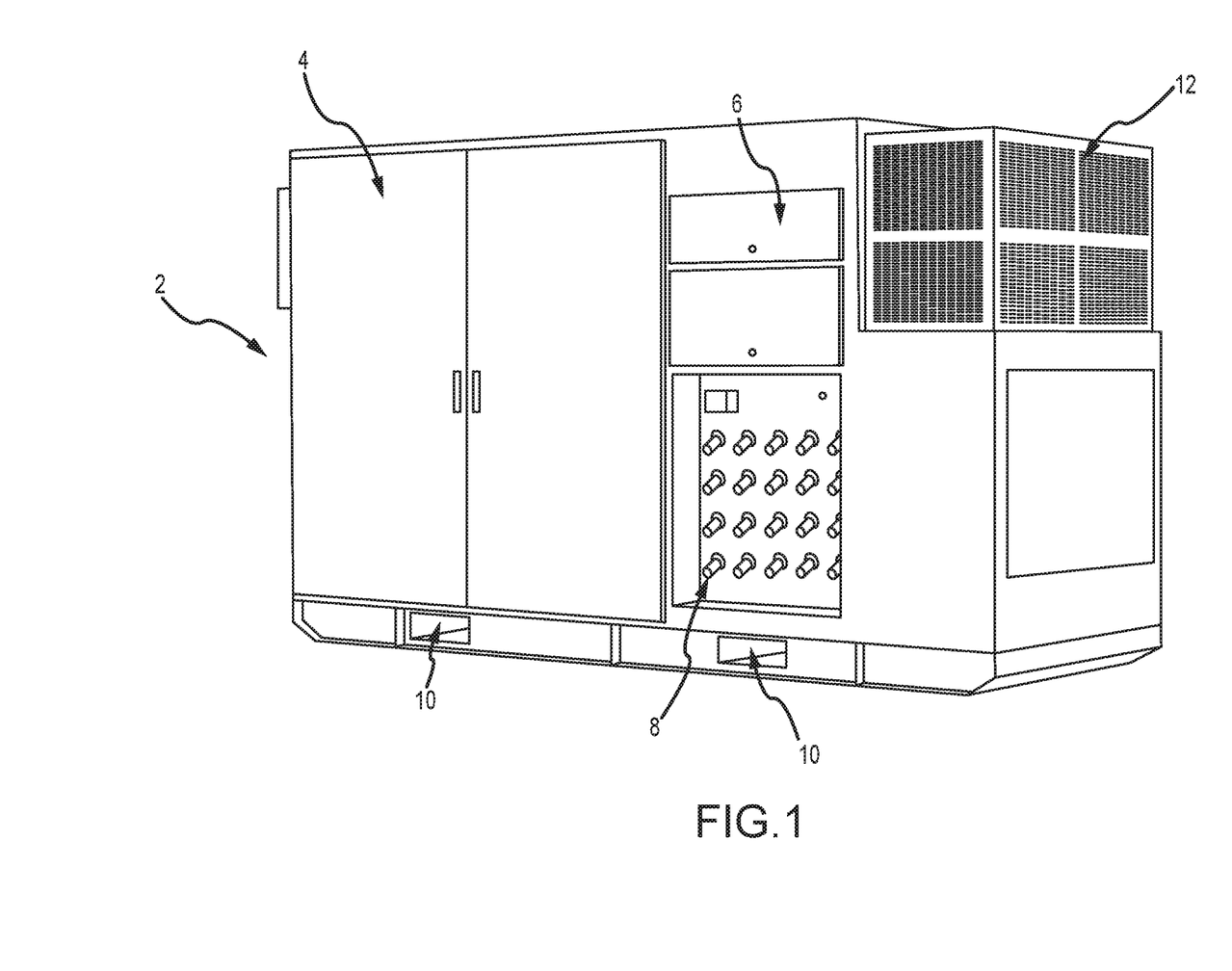
FIG. 1 is a perspective view of a hybrid generator system according to one embodiment of the present disclosure.

FIG. 1 is a perspective view of an ESM 2 according to one embodiment of the present disclosure. As shown, the ESM 2 comprises a main panel 4 to allow access to internal components. At least one secondary panel 6 is provided to access features that will be shown and described herein. Various input and output connections 8 are provided on an external surface of the ESM 2. A plurality of lifting eyes and forklift pockets 10 are provided to allow the ESM to communicate with a forklift. A cooling module 12 is provided to provide heat management and cooling for an inverter.

Figure 2:
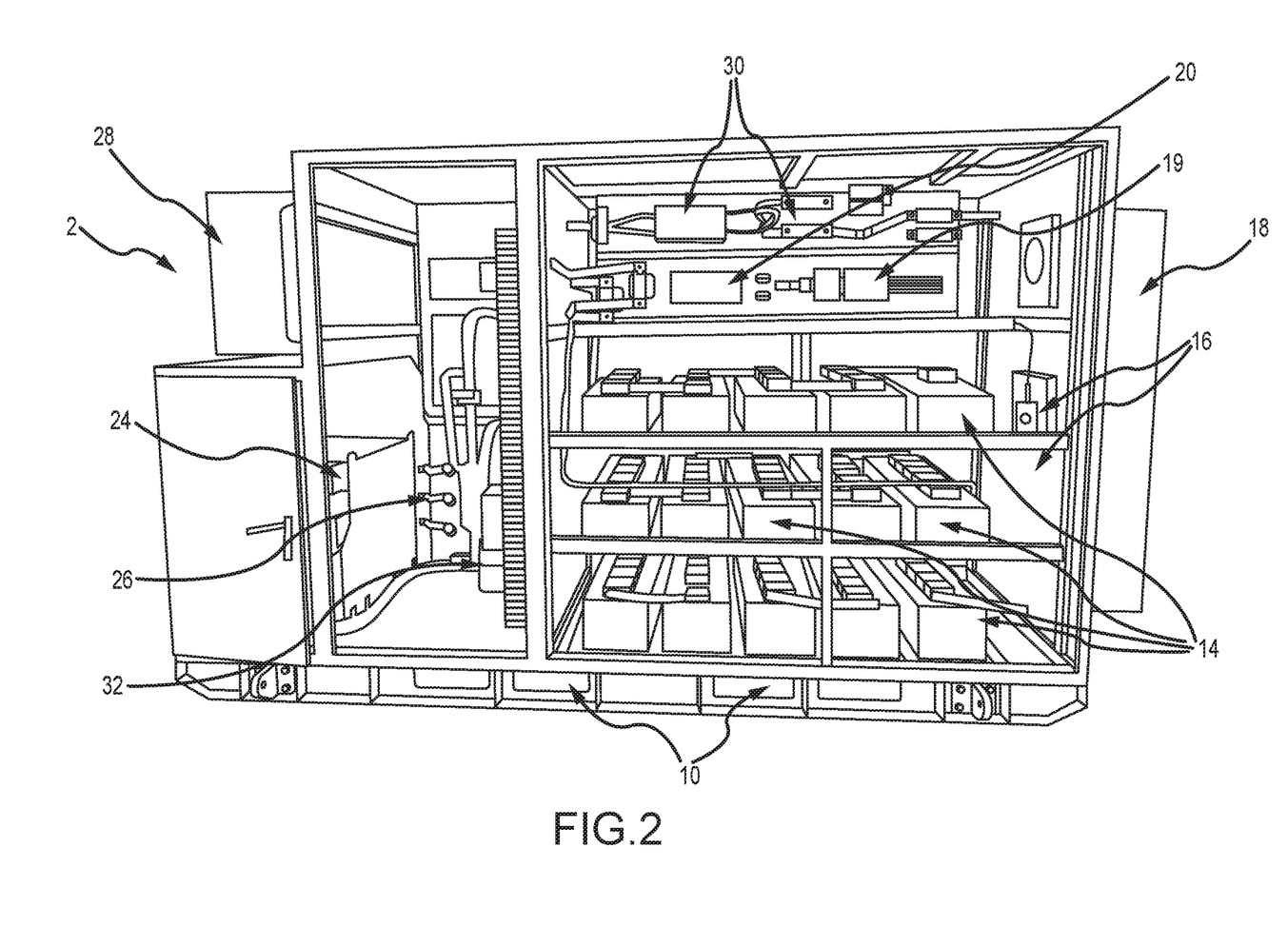
FIG. 2 is a perspective view of a hybrid generator system an internal components thereof according to one embodiment of the present disclosure.

FIG. 2 is a perspective view of the ESM 2 of FIG. 1 and showing various internal components and features thereof. As shown, a plurality of battery modules 14 are provided. In the depicted embodiment, battery modules 14 are provided to provide a 120 kWh battery powered system. However, no limitation with respect to the number, size, or type of batteries is provided. A fire suppression and heat trace element 16 is provided proximal to the batteries 14. A battery heat management system 18 is provided, the system 18 being operable to vent heat from the batteries to an external environment, and/or heat the battery area as needed. A battery management system 19 is provided that regulates the effective charging and discharging of the energy storage resources while monitoring the electrical current, voltage and temperature of each cell within the larger system. A DC/DC power converter 20 utilizes high-voltage DC current for providing lower DC control voltage. A DC filtering and fusing feature 30 is provided for DC voltage conditioning and over current protection. An inverter 24 is provided that is in communication with the batteries 14 and wherein the inverter 24 is operable to convert a direct current from the batteries to an alternating current. An AC output 26 is provided as a power output. In the depicted embodiment, the inverter 24 comprises a 500 kVA inverter. A dedicated cooling module 28 is provided to dissipate heat from the inverter 24. The cooling module 28 comprises a closed loop cooling fluid that is operable to convey heat from the inverter 24 to an exterior environment. Filtering and fusing modules 30 are provided for a DC power supply. A transformer 32 is further provided within the confines of the ESM 2.

Figure 3:
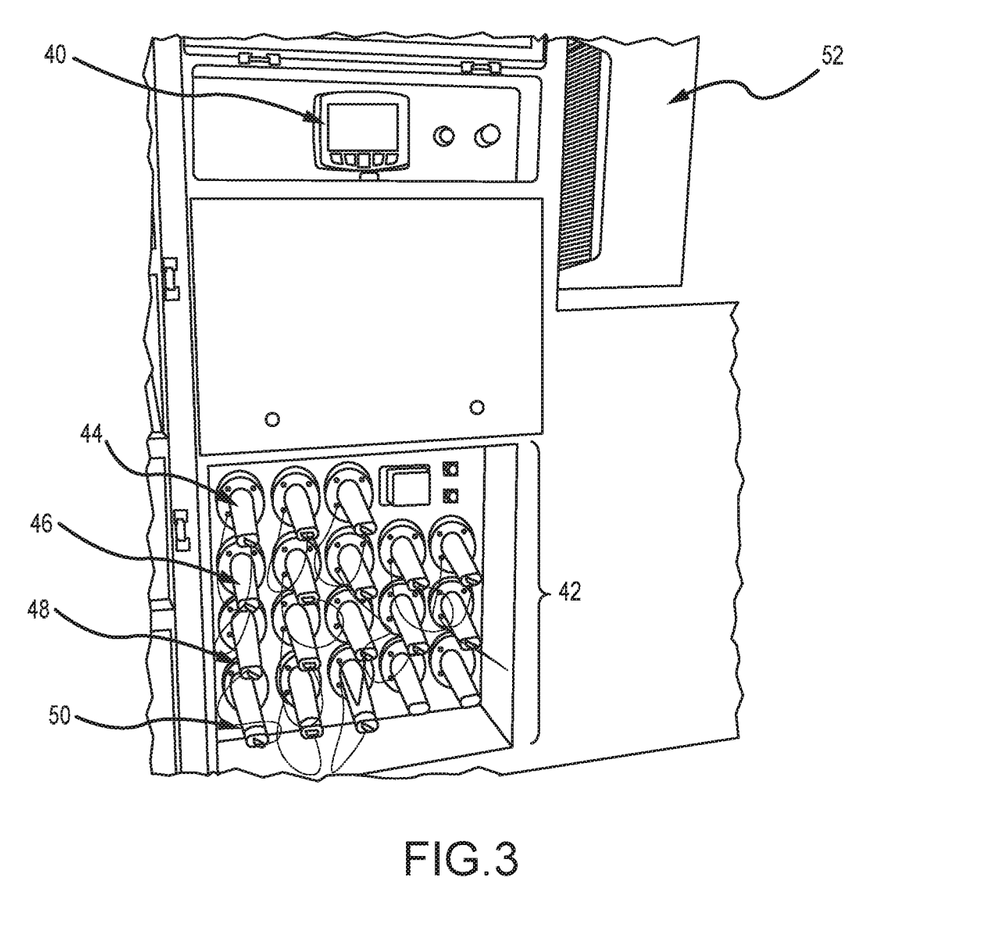
FIG. 3 is a perspective view of a hybrid generator system an components thereof according to one embodiment of the present disclosure.

FIG. 3 is a detailed perspective view of the ESM 2. As shown, the ESM 2 comprises a human machine interface ("HMI") panel 40 for manual control of the ESM and inverter. A plurality of connections 42 are provided. For example, a three-phase power input 44 is provided to supply power to the batteries of the ESM. An isolation transformer output 46 is provided to transfer electrical power to an external device. An isolation transformed input 48 is further provided. A three-phase power output 50 is provided. A cooling module 52 is shown in FIG. 3. The cooling module 52 preferably comprises a serviceable and/or replaceable air filter.

In various embodiments, hybrid generator systems are provided that comprise control features and which are operable to be tuned to match requirements and specifications of various loads, including various three-phase loads. In some embodiments, hybrid generator systems are operable to only provide power to loads when certain conditions are met and when such loads are within certain operating limits established by the specific load being supported (i.e. provided with power). For example, in some embodiments, devices and methods are provided wherein a conventional internal-combustion engine provides a baseline power, and an ESM provides supplemental power based on load and demand variability and to correct for a deflection in the waveform of current and frequency as a variable load is applied. The internal combustion unit of the generator provides various advantages as a power generation unit. However, this component of the generator system is known to respond relatively slowly to changes in load. Specifically, the gas-fired or internal combustion unit must be signaled to throttle control of combustion up or down, a conversion from chemical energy in a fuel to heat to mechanical/kinetic energy and finally to an electrical energy necessarily requires a certain amount of time for the internal combustion unit to respond to changes in load or demand. These amounts of time are generally greater than what an ESM is capable of providing through direct discharge of stored electrical power.

Figure 4A:
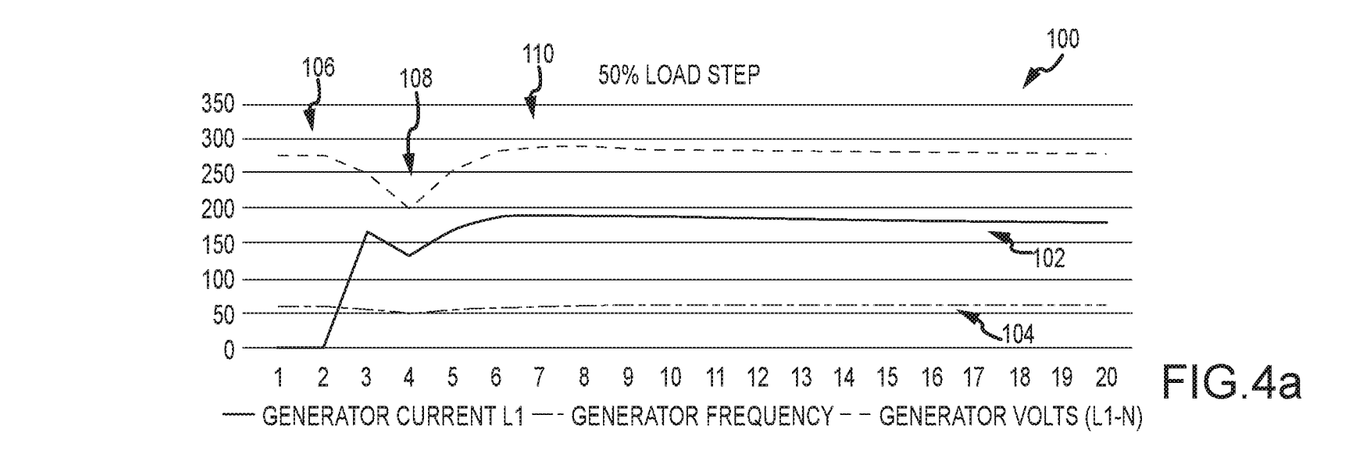
FIG. 4a is plot showing a load step in a conventional generator.
Figure 4B:
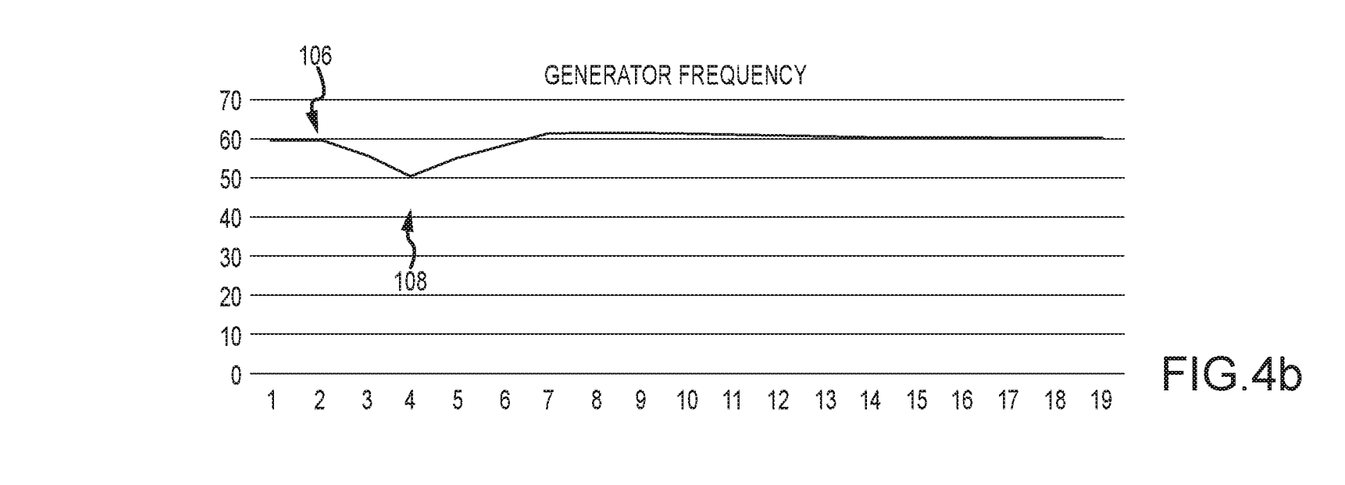
FIG. 4b is a plot showing a frequency drop caused by a load step.

FIG. 4a is a plot illustrating portions of this concept. Specifically, FIG. 4a illustrates a voltage and frequency deflection as experienced by a generator unit during a 50% load step (i.e. increase). Three separate plot lines are provided in FIG. 4a. Specifically, a generator voltage 100 over time is shown with voltage values provided on the Y-axis. A generator current 102 is also shown, with current values shown in the Y-axis. A generator frequency is provided, with frequency values shown on the Y-axis. Time is displayed on the x-axis, with each increment representing 0.25 seconds. As shown in FIGS. 4a-4b, a current value 102 initially provided at zero. The test shown by FIGS. 4a-4b is initiated with zero load provided on the generator.

The data provided in FIGS. 4a-4b is representative of the operating conditions of a conventional gas-powered generator. During a load step 106, which is contemplated as a 50% load increase, a temporary but significant reduction in voltage 100, current 102 and frequency 104 from the generator is experienced. As shown, the 50% change in load can result in a nearly 30% decrease in generator voltage, a 20% or greater decrease in generator current, and a 15% or greater decrease in generator frequency. As is further shown in FIGS. 4a-4b, the conventional generator comprises an ability to recover and stabilize from these fluctuations, but only after a significant amount of time has elapsed.

FIG. 4b is a plot showing only the generator frequency data 104 from FIG. 4a for illustrative purposes. As shown, the generator frequency's normal operation comprises an AC frequency of 60 Hz. Under a 50% load increase, the conventional generator depicted in FIG. 4b experiences a sudden reduction in frequency 106 wherein the frequency is sharply reduced to approximately 50 Hz at a minimum value or droop 108. Conventional generators expose sensitive loads to voltage and frequency instability during loading and/or unloading.

Figure 5:
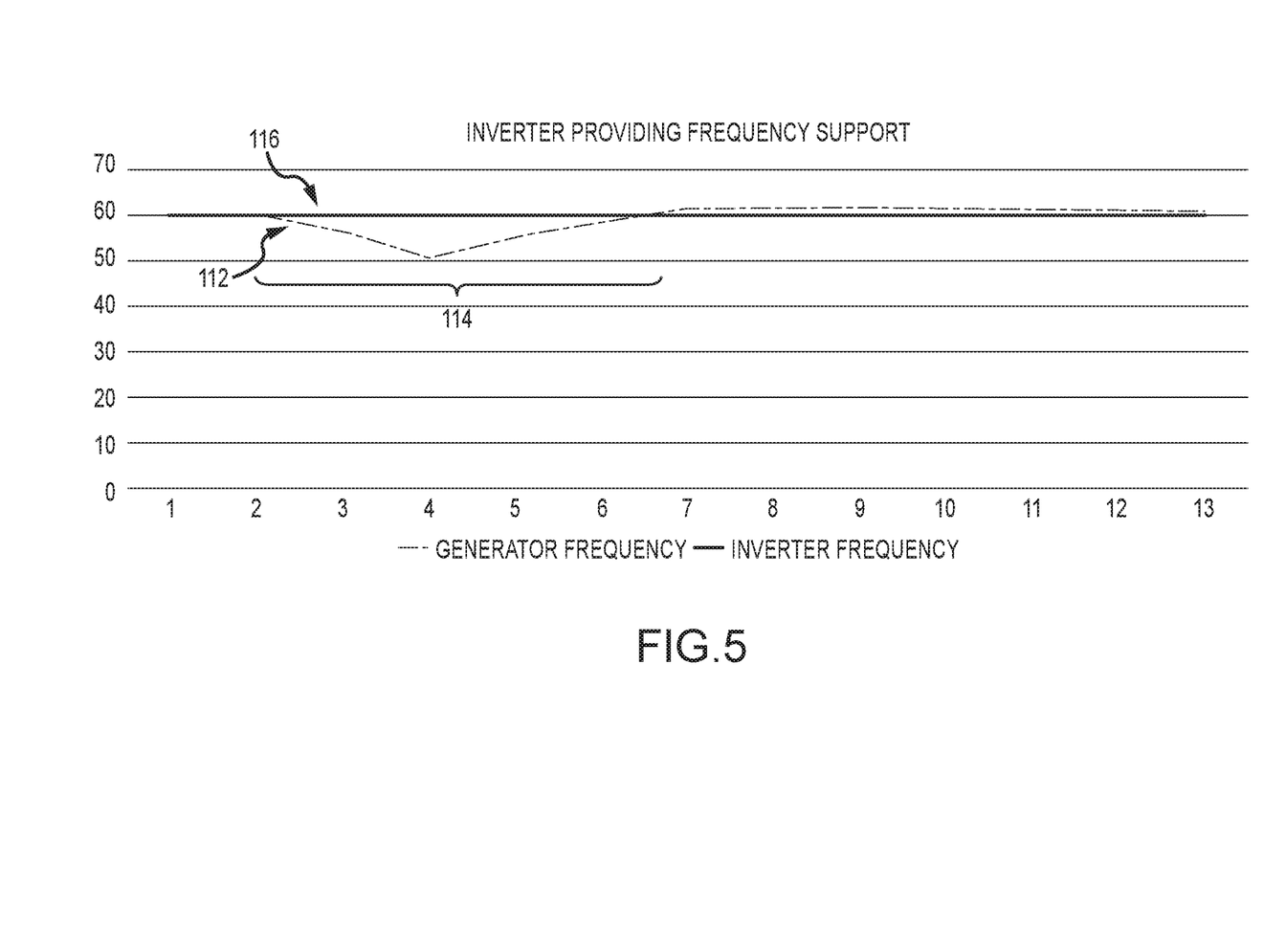
FIG. 5 is a plot showing an inverter-supported frequency during a load step and according to various embodiments of the present disclosure.

FIG. 5 is a plot showing a generator system according to embodiments of the present disclosure wherein a control system is provided. The control system of the depicted embodiment provides power from an ESM such that a generator frequency 112 is maintained at a specific load frequency requirement (approximately 60 Hz in the depicted embodiment). The supplemental power supply and related control mechanisms exponentially reduces a frequency "droop" 114, in both magnitude and time such that the droop is nearly imperceptible. FIG. 5 shows both a generator frequency 112 and an inverter frequency 116. The inverter frequency comprises a frequency from an inverter that supplies alternating current from an ESM, and that frequency 116 is substantially constant even during a significant load step (i.e. between 59.8 Hz and 61.6 Hz). Generator systems according to the present disclosure provide reliable and consistent frequency, voltage and current delivery, and are also programmable to match specific load requirements such that power can only be delivered in a range that is within the supported load's limits thus assuring reliable and consistent operation of various equipment to which the generator systems provide power.

Figure 6:
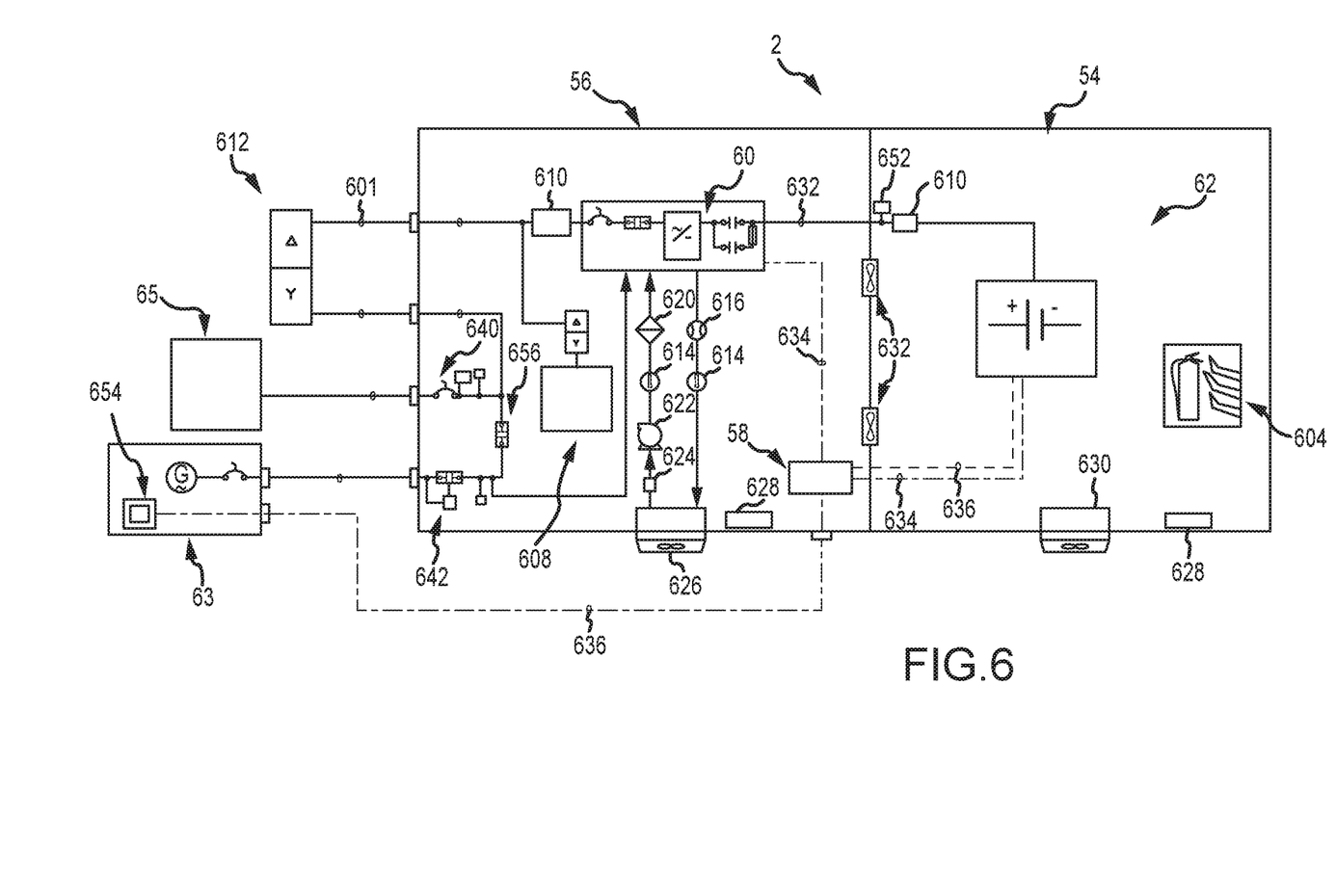
FIG. 6 is a schematic of an energy storage module according to one embodiment of the present disclosure.

FIG. 6 is a schematic showing an ESM 2 according to one embodiment of the present disclosure in communication with a generator 63. The ESM 2 and connected generator 63 are operable to provide power to a load 65. The load 65 may comprise any one or more devices or systems, and no limitation with respect to the same is provided herewith. For example, ESMs and generators of the present disclosure can provide electrical power to a pre-existing grid, a facility (e.g. a hospital building), a stand-alone device (e.g. a downhole pump), and various other systems and devices that require electrical power and that will be recognized by one of ordinary skill in the art. The ESM 2 of FIG. 6 comprises a battery enclosure module 54 and an inverter and control module 56. The various features and components of the inverter and control module 56 are operable to convert a direct current provided by the batteries of the battery module 54 to an alternating current suitable for output to various devices and system. The inverter and control module 56 is further operable to monitor, analyze, and control an output. A controller 58 is provided that is in communication with an inverter 60, a controller 654 of the generator and at least one battery 62 of the battery module 54. The controller 58 is operable to perform at least one of the following functions: detect a change in generator output (voltage, current, and/or frequency), signal a change in demand or load to the battery module 54, demand additional power from the battery module 54, and demand or signal an increase or decrease in generator functions (e.g. engine speed). The controller 58 is operable to perform these tasks and communicate with the aforementioned devices using through a variety of methods/protocols such as Modbus TCP/IP 636, Canbus 634, and others know to those skilled in the art.

The at least one battery 62 can be combined with other batteries in series or in parallel to provide a power source. Any single battery 62 may have nominal voltages of about 936 VDC, voltage ranges from about 650 to about 1066 VDC, capacity of 123.5 KWH, as well as a number of other electrical properties. In order to reduce noise, the battery module 54 is contemplated as being provided in communication with an electromagnetic interference (EMI)filter 610. The EMI filter 610 reduces noise from battery 62 and from other ESM components or external devices. EMI filters can also be used to control noise in inverter and control module 56. A ground fault detector 652 is contemplated as being provided in various locations within systems of the present disclosure, including proximal to the EMI filter.

The battery module 54 of various embodiments comprises a fire suppression system 604. The fire suppression system 604 is preferably provided proximal to at least one battery 62, outside of the battery module 54, and/or outside the ESM 2. Furthermore, additional heat management may be contained in the battery module 54, such as an air conditioner 630 or a fan 632. One of ordinary skill in the art will recognize that various devices of the present disclosure, including batters (e.g. lithium-ion batteries) must be maintained within a preferred temperature range to optimize performance and safety of the battery or batteries.

Safety features are also contemplated as being incorporated into inverter and control module 56. For instance, inverter 60 is contemplated as being in thermal communication with a heat exchanger 626. In some embodiments, the thermal communication pathway between the inverter 60 and heat exchanger 626 is contemplated as being equipped with temperature sensors 614, flow sensors 616, a filter 620, a pump 622, and a reservoir 624. The various devices help to further ensure the safety and reliability of ESM 2. Furthermore, additional pumps/fans 608 can be added to the inverter and control module 56 to aid in cooling.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention.

What is claimed is:

1. A method of determining, using a stand-alone energy storage module (ESM) and an ESM controller, which of one or more energy sources is connected to the ESM,
   wherein the ESM controller is configured to be in communication with one or more controllers associated with the one or more energy sources;
   wherein the stand-alone ESM comprises a movable structure comprising:
      batteries for receiving, storing, and distributing electrical power;
      a bi-directional inverter that is in communication with the batteries and that is operable to convert direct current (DC) to alternating current (AC) and to convert AC to DC;
      the ESM controller in communication with the bi-directional inverter and at least one of the batteries; and electrical connections comprising:
an AC power output in communication with the bi-directional inverter and configured to provide power to an external load; and
AC power inputs in communication with the bi-directional inverter and configured to provide power to the batteries;
wherein the AC power inputs are adapted to be connected to the one or more energy sources, the one or more energy sources comprising at least one of:
an engine-driven generator;
a renewable energy source; or
a utility grid or a multi-MW generating device;
wherein the method comprises:
signaling, using the ESM controller, a demand to the one or more energy sources for an increase in power;
monitoring, by the ESM controller, a response from the one or more energy source in response to the signaled demand;
wherein the response from the one or more energy source comprises:
at least one of a voltage, a current, and a frequency of the one or more energy sources as a result of the demand for additional power; or
at least one of a rate of change of the voltage, the current, and the frequency, of the one or more energy sources as a result of the demand for additional power; and
determining, by the ESM controller, which of the one or more energy sources is connected to the stand-alone ESM and responded to the demand for additional power, wherein:
when the response from the one or more energy sources is a steady output response without a droop curve, the one or more energy sources is identified as the renewable energy source;
when the response from the one or more energy sources is a non-steady output response that includes a droop curve, the one or more energy sources is identified as the engine-driven generator; and
when the response from the one or more energy sources includes a non-steady output response without a droop curve, then the one or more energy sources is identified as the utility grid or the multi-MW generating device.

2. The method of claim 1,
wherein the AC power inputs are configured to connect to the one or more energy sources in each of a first, second, third, and fourth configuration such that the ESM is a deployable self-forming microgrid;
wherein, when in the first configuration, the AC power inputs are connected to the engine-driven generator and the utility grid;
wherein, when in the second configuration, the AC power inputs are connected to the engine-driven generator and the renewable energy source;
wherein, when in the third configuration, the AC power inputs are connected to the utility grid and the renewable energy source; and
wherein, when in the fourth configuration, the AC power inputs are connected to the engine-driven generator, the renewable energy source, and the utility grid or the multi-MW generating device.

3. The method of claim 2, further comprising:
monitoring, by the ESM controller, the AC power inputs;
recording, by the ESM controller, AC input responses to each significant power loading or unloading event; and
auto-correcting, by the ESM controller, operation of the bi-directional inverter to continuously optimize tuning, based on the recorded AC input responses, as the AC input varies to allow for the deployable self-forming microgrid to adjust to variability in the one or more energy sources.

4. The method of claim 1, further comprising:
monitoring, by the ESM controller, the AC power inputs;
recording, by the ESM controller, AC input responses to each significant power loading or unloading event; and
auto-correcting, by the ESM controller, operation of the bi-directional inverter to continuously optimize tuning, based on the recorded AC input responses, as the AC input varies.

5. The method of claim 1, further comprising:
monitoring, by the ESM controller, AC input characteristics; and
optimizing, by the ESM controller, inverter tuning to match the AC input characteristics, wherein when the one or more energy sources comprises the engine-driven generator, the optimized inverter tuning comprises a defined frequency output range in which the frequency output of the engine-driven generator is maintained.

6. The method of claim 1,
wherein the one or more energy sources comprises the engine-driven generator and the one or more controllers associated with the one or more energy sources includes a generator controller;
wherein tuning parameters associated with the engine-driven generator are stored in the generator controller but inaccessible to the ESM controller; and
wherein the method further comprises:
commanding, by the ESM controller, the engine-driven generator via the generator controller to respond to predetermined load steps;
monitoring, by the ESM controller, the response of the engine-driven generator to the command; and
determining, by the ESM controller, based on the response to the command, the tuning parameters associated with the engine-driven generator.

7. The method of claim 6,
wherein tuning parameters associated with the ESM are stored in the ESM controller;
wherein the method further comprises adjusting, by the ESM controller, the tuning parameters associated with the ESM based on the tuning parameters associated with the engine-driven generator; and
wherein the tuning parameters associated with the ESM comprises a specific frequency output range in which the frequency output of the engine-driven generator is maintained.

8. The method of claim 1, wherein the batteries, the bi-directional inverter, the ESM controller, and the electrical connections are positioned on a movable structure.

9. The method of claim 8, wherein the movable structure comprises a plurality of lifting eyes and forklift pockets.

10. A method of anticipating and preemptively responding to power loading and power unloading events using a stand-alone energy storage module (ESM),
wherein the ESM comprises:
batteries for receiving, storing, and distributing electrical power;

a bi-directional inverter that is in communication with the batteries and that is operable to convert direct current (DC) to alternating current (AC) and to convert AC to DC;
an ESM controller in communication with the bi-directional inverter and at least one of the batteries; and
electrical connections comprising:
  an AC power output in communication with the bi-directional inverter and configured to provide power to an external load; and
  AC power inputs in communication with the bi-directional inverter and configured to provide power to the batteries;
    wherein the AC power inputs are adapted to be connected to one or more energy sources, the one or more energy sources comprising at least one of:
      an engine-driven generator;
      a renewable energy source; and
      a utility grid or a multi-MW generating device; and
wherein the method comprises:
  monitoring power loading and unloading events associated with the external load;
  recording the power loading and unloading events associated with the external load;
  anticipating, based on the recorded power loading and unloading events, predicted power loading and unloading events; and
  preemptively responding to the predicted power loading or unloading events by controlling power output of at least one of the one or more energy sources and the batteries of the ESM;
wherein the one or more energy sources comprises the engine-driven generator;
wherein the engine-driven generator comprises a generator controller;
wherein tuning parameters associated with the engine-driven generator are stored in the generator controller but inaccessible to the ESM controller; and
wherein the method further comprises:
  commanding, by the ESM controller, the engine-driven generator via the generator controller to respond to predetermined load steps;
  monitoring, by the ESM controller, the response of the engine-driven generator to the command; and
  determining, by the ESM controller, based on the response to the command, the tuning parameters associated with the engine-driven generator.

11. The method of claim 10,
wherein the AC power inputs are configured to connect to the one or more energy sources in each of a first, second, third, and fourth configuration such that the ESM is a deployable self-forming microgrid;
wherein, when in the first configuration, the AC power inputs are connected to the engine-driven generator and the utility grid;
wherein, when in the second configuration, the AC power inputs are connected to the engine-driven generator and the renewable energy source;
wherein, when in the third configuration, the AC power inputs are connected to the utility grid and the renewable energy source; and
wherein, when in the fourth configuration, the AC power inputs are connected to the engine-driven generator, the renewable energy source, and the utility grid.

12. The method of claim 11, further comprising:
monitoring, by the ESM controller, the AC power inputs;
recording, by the ESM controller, AC input responses to each significant power loading or unloading event; and
auto-correcting, by the ESM controller, operation of the bi-directional inverter to continuously optimize tuning, based on the recorded AC input responses, as the AC input varies to allow for the deployable self-forming microgrid to adjust to variability in the one or more energy sources.

13. The method of claim 10, further comprising:
monitoring, by the ESM controller, the AC power inputs;
recording, by the ESM controller, AC input responses to each significant power loading or unloading event; and
auto-correcting, by the ESM controller, operation of the bi-directional inverter to continuously optimize tuning, based on the recorded AC input responses, as the AC input varies.

14. The method of claim 10, further comprising:
monitoring, by the ESM controller, AC input characteristics; and
optimizing, by the ESM controller, inverter tuning to match the AC input characteristics, wherein when the one or more energy sources comprises the engine-driven generator, the optimized inverter tuning comprises a defined frequency output range in which the frequency output of the engine-driven generator is maintained.

15. The method of claim 10,
wherein tuning parameters associated with the ESM are stored in the ESM controller;
wherein the method further comprises adjusting, by the ESM controller, the tuning parameters associated with the ESM based on the tuning parameters associated with the engine-driven generator; and
wherein the tuning parameters associated with the ESM comprises a specific frequency output range in which the frequency output of the engine-driven generator is maintained.

16. The method of claim 10, wherein the batteries, the bi-directional inverter, the ESM controller, and the electrical connections are positioned on a movable structure.

17. The method of claim 16, wherein the movable structure comprises a plurality of lifting eyes and forklift pockets.

* * * * *